United States Patent

Matsubayashi et al.

[11] Patent Number: 5,904,345
[45] Date of Patent: May 18, 1999

[54] VIBRATION-DAMPING ASSEMBLY

[75] Inventors: Tatsuhiko Matsubayashi, Kanagawa; Satoru Kikuchi; Isamu Sekizawa, both of Tokyo, all of Japan

[73] Assignee: Kioritz Corporation, Tokyo, Japan

[21] Appl. No.: 08/757,108

[22] Filed: Dec. 2, 1996

[30] Foreign Application Priority Data

Dec. 1, 1995 [JP] Japan ................................. 7-314533

[51] Int. Cl.⁶ ................................. F16F 15/04; F16F 3/12
[52] U.S. Cl. ............................ 267/152; 248/621; 267/30; 267/136
[58] Field of Search ................................. 267/152, 136, 267/30, 86, 242, 259, 141.5, 137, 140.3, 140.4, 158, 160, 164, 44, 41, 269; 30/276, 347; 248/638, 634, 636, 526, 619–621

[56] References Cited

U.S. PATENT DOCUMENTS

| 1,768,494 | 6/1930 | Schjolih | 267/44 |
|---|---|---|---|
| 1,815,170 | 7/1931 | Summers | 248/621 |
| 2,490,184 | 12/1949 | Wojtech, Jr. | 267/41 |
| 2,492,965 | 1/1950 | Carr | 267/41 |
| 3,168,300 | 2/1965 | Giovinazzo | 267/41 |
| 3,312,459 | 4/1967 | Pence . | |
| 3,414,252 | 12/1968 | Frager et al. | 267/30 |
| 3,514,089 | 5/1970 | Harbers | 267/269 |
| 3,680,850 | 8/1972 | Preddy, Jr. | 267/269 |
| 4,093,197 | 6/1978 | Carter et al. | 267/41 |
| 4,744,547 | 5/1988 | Härtel | 267/30 |
| 4,800,624 | 1/1989 | Whitefoot et al. . | |
| 4,860,664 | 8/1989 | Kunczynski | 104/204 |
| 5,102,107 | 4/1992 | Simon et al. | 248/621 |
| 5,358,210 | 10/1994 | Simon et al. | 267/41 |

FOREIGN PATENT DOCUMENTS

| 59-180136 | 10/1984 | Japan . | |
|---|---|---|---|
| 1149373 | 4/1969 | United Kingdom | 248/621 |

*Primary Examiner*—Douglas C. Butler
*Attorney, Agent, or Firm*—Baker & Botts, L.L.P.

[57] ABSTRACT

To provide a vibration-damping assembly sufficiently functions in wide range of vibration with improved durability, and effective spring constant thereof can easily be changed as occasion demands. The vibration-damping assembly comprises a leaf spring (20) and a vibration-damping rubber (23) which are connected to each other in series, and a base end portion of the leaf spring (20) is secured to stand portions (3B, 3C) of a support (3), and another end of the vibration-damping rubber (23), which is not connected to the leaf spring (20), is connected to the prime mover (10).

2 Claims, 6 Drawing Sheets

VIBRATION-DAMPING ASSEMBLY

BACKGROUND OF THE INVENTION

1. Field of the Invention

The present invention relates to a vibration-damping assembly disposed between a prime mover as a source of vibration such as an internal combustion engine and a support for the prime mover, and more particularly to a vibration-damping assembly which is preferably mounted between a support and a prime mover in a portable working machine.

2. Description of the Prior Art

Generally, in a portable working machine, for instance, a vibration-damping assembly is mounted between an internal combustion engine or the like as a prime mover and a support to prevent the propagation of vibration caused by a prime mover such as an internal combustion engine to a worker, and various vibration-damping assembly have been proposed and put to practical use. One of the vibration-damping assembly is disclosed in Japanese Examined Utility Model Publication No. 9793/1988 and so on.

In conventional vibration-damping assembly, as described in the above-mentioned Publication, a vibration-damping rubber as a vibration-damping member or a coil spring is often independently used. However, a single vibration-damping member can not cover wide range of vibration, that is, the range of vibration that a single vibration-damping member sufficiently functions as it is narrow. For instance, it is difficult for vibration-damping rubber only to cover overall range of rotation of an internal combustion engine. On the other hand, a coil spring functions in wide range of vibration, however, the coil spring is susceptible to malfunction as time passes, that is, its durability is a problem.

Further, it is desirable to change the spring constant in accordance with the replacement of an internal combustion engine or members accompanying the engine to provide the best vibration-damping efficiency, however, in conventional vibration-damping assembly, the spring constant can not be changed, therefore, it is necessary to replace overall vibration-damping assembly, resulting in troublesome work and disadvantage in cost.

SUMMARY OF THE INVENTION

The present invention has been made in consideration of the above-mentioned problems of conventional vibration-damping assembly, and the object thereof is to provide a vibration-damping assembly sufficiently functions in wide range of vibration with improved durability, and effective spring constant thereof can easily be changed as occasion demands.

To accomplish the above-mentioned object, the vibration-damping assembly according to the present invention basically comprises a leaf spring and a vibration-damping rubber which are connected to each other in series.

The leaf spring and the vibration-damping rubber, which are connected to each other in series, are preferably disposed between a support and a prime mover in a portable power working machine, and a base end portion of the leaf spring is secured to stand portions of the support, and another end of the vibration-damping rubber, which is not connected to the leaf spring, is connected to the prime mover.

As a preferred embodiment of the present invention, a long hole is formed on the leaf spring so as to extend from a fixed base end portion side to a free end portion side of the leaf spring, and an insertion securing member projecting from a lower end of the vibration-damping rubber is inserted into the long hole, and a position that the vibration-damping rubber is connected and secured to the leaf spring is changeable in a direction that the long hole extends.

Further, the leaf spring of the vibration-damping assembly is divided into a plurality of spring portions such that at least a portion of the leaf spring on a free end side from a central portion thereof is independently bent, and the number of portions functioning as vibration-damping members increases as amplitude of vibration increases.

Further, the leaf spring is preferably divided into a central spring portion and an outer peripheral spring portion with a U-shaped channel in between so as to allow a portion of the leaf spring on the free end side thereof from a center to independently bend, and a mounting portion projecting from a lower end of the vibration-damping rubber has a convex cross section with a downward projection, and a lower portion with smaller diameter of the mounting portion is connected and secured to the central spring portion of the leaf spring, and after the central spring portion of the leaf spring bends more than a predetermined amount, the outer peripheral spring portion is pressed to an upper portion with larger diameter of the mounting portion.

Still further, the leaf spring portion of the vibration-damping assembly may comprise a long leaf spring member and a short leaf spring member shorter than the long leaf spring member, and the long leaf spring member and the short leaf spring member are overlapped with each other, and base end portions of the members are detachably connected to each other. In the vibration-damping assembly with the aforementioned construction according to the present invention, a leaf spring and a vibration-damping rubber with spring constants different from each other are connected to each other in series, so that the vibration-damping assembly with the leaf spring and the vibration-damping rubber has sufficient vibration-damping effect in wider range of vibration in comparison with a vibration-damping assembly with a leaf spring or a vibration-damping rubber, and the durability of the vibration-damping assembly is improved in comparison with a vibration-damping assembly with a coil spring only.

Further, in the vibration-damping assembly according to the present invention, a long hole is preferably formed on the leaf spring in such a manner as described above, so that the position that the vibration-damping rubber is connected and secured to the leaf spring is changeable in a direction that the long holes extend as occasion demands, or the leaf spring portion may comprises a long leaf spring member and a short leaf spring member shorter than the long leaf spring member of which base end portions are connected to each other, and for instance, a plurality kinds of leaf springs as short leaf spring members with different length from each other are prepared, and a short leaf spring is replaced in accordance with required length as occasion demands. As a result, the effective spring constant of the leaf spring portion is changed, therefore, when an engine mounted is changed for instance, the effective spring constant of the vibration-damping assembly is adjusted to obtain the best vibration-damping effect.

In the vibration-damping assembly according to the present invention, the leaf spring is divided into a plurality of spring portions so as to allow a portion of the leaf spring on the free end side from the center thereof to independently bend, and the number of portions functioning as vibration-damping members increases as amplitude of vibration increases. As a result, the spring constant of the leaf spring changes in a plurality of stages, permitting the range of amplitude of vibration (vibrating force) that the vibration-damping assembly covers to considerably be increased from minute vibration to rolling or the like.

DESCRIPTION OF THE PREFERRED EMBODIMENTS

Figure 1:
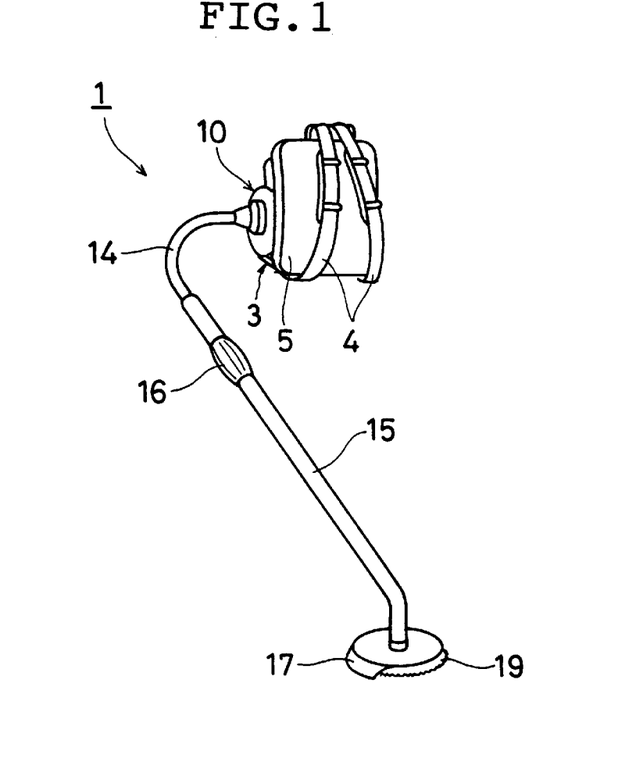
FIG. 1 is a schematic perspective view of a portable power grass trimmer to which a vibration-damping assembly according to the first embodiment of the present invention is applied.
Figure 2:
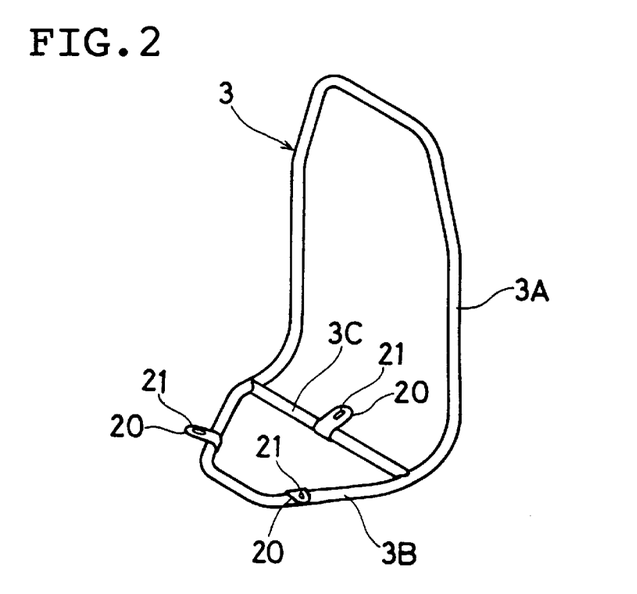
FIG. 2 is a perspective view of a support of the vibration-damping assembly shown in FIG. 1.

FIG. 1 shows a portable power grass trimmer 1 to which a vibration-damping assembly according to the first embodiment of the present invention is applied. As illustrated in FIG. 2, the portable power grass trimmer 1 is provided with an L-shaped metal pipe support 3 in side view, and the support 3 consists of a support frame portion 3A with a shape of reversed character U in front view, a U-shaped stand portion 3B in plan view which bends rearward from the lower end of the support frame portion 3A, and a front stand portion 3C as a cross bar bridging the stand portion 3B at an open end thereof. A waist cushion 5 and carrying bands 4 (see FIG. 1) are attached to the support frame portion 3A of the support 3.

Figure 3:
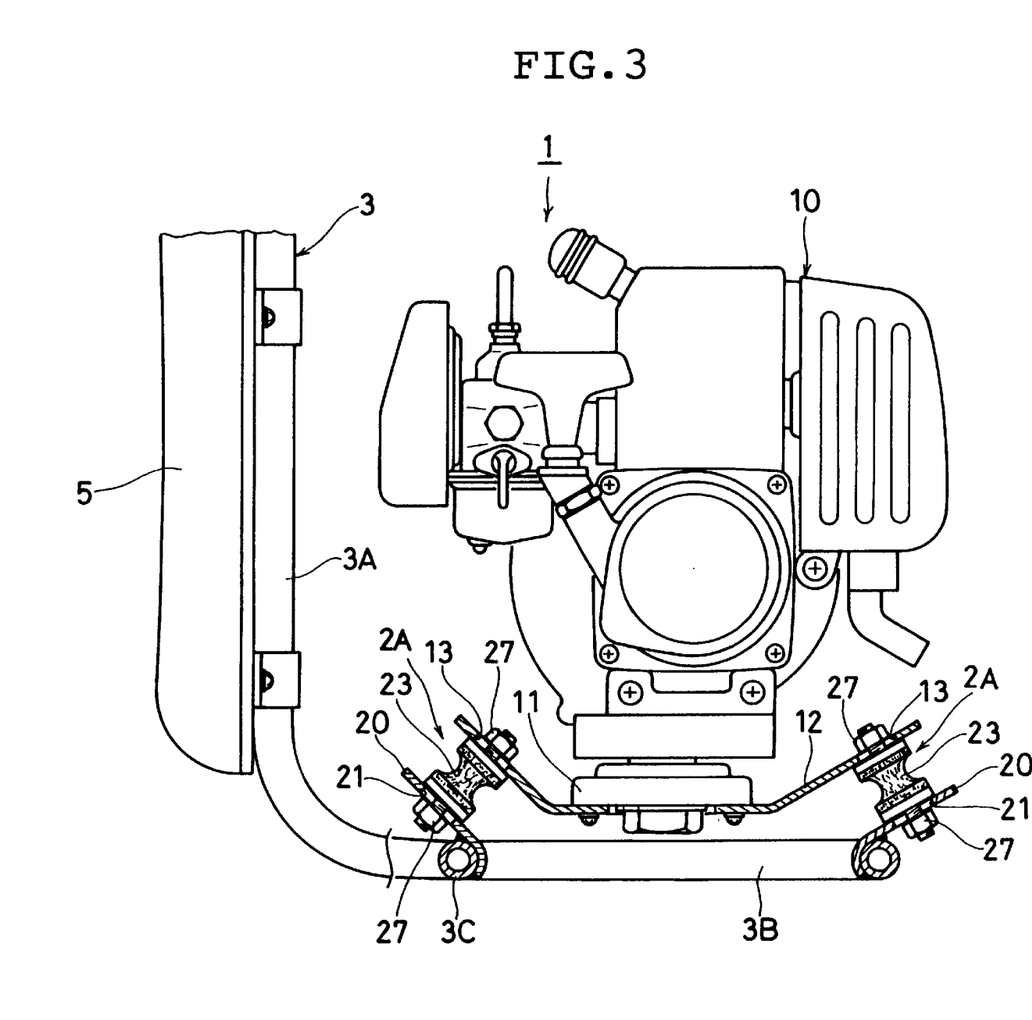
FIG. 3 is a fragmented side view of a primary portion of the portable power grass trimmer shown in FIG. 1 where the vibration-damping assembly according to the first embodiment of the present invention is mounted.

As illustrated in FIGS. 2 and 3, each of the stand portions 3B, 3C of the support 3 is provided with three sets of vibration-damping assembly according to this embodiment 2A described below in detail, and a small-sized air-cooled two-cycle gasoline engine 10 as a prime mover is mounted interposing the vibration-damping assemblies 2A.

To an output shaft (not shown) of the engine 10, as illustrated in FIG. 1, is connected an operation rod 15 with a grip 16 via a flexible shaft 14, and the operation rod 15 is provided at an end thereof with a cutter means consisting of a cutter blade 19, which is driven and rotated by a built-in drive shaft (not shown), a protecting cover 17, and the like.

As clearly understood from FIG. 3 in addition to FIG. 2, at both right and left sides of the stand portion 3B of the support 3 and at a central portion of the front stand portion 3C are mounted the vibration-damping assemblies 2A according to the present invention at regular angles (120°) among them. The vibration-damping assembly 2A consists of a leaf spring 20 made of stainless steel and a vibration-damping rubber 23 that are connected to each other in series.

Respective leaf springs 20 of the three sets of vibration-damping assembly 2A bend along the outer periphery of pipes of the stand portions 3B, 3C at base end portions thereof, and the base end portions are welded to the stand portions 3B, 3C while free ends of the leaf springs 20 are directing outward and diagonally upward. As clearly illustrated in FIGS. 4 and 5, on each of the leaf springs 20 is formed a long hole 21 extending from the fixed base end portion to the free end and passing through a center line in a longitudinal direction thereof.

Figure 4:
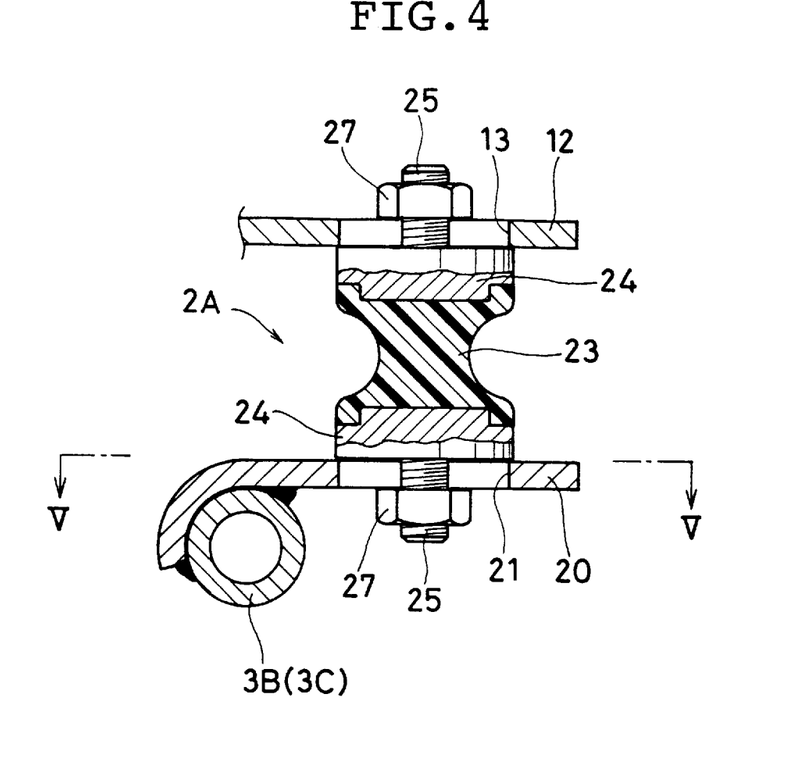
FIG. 4 is a fragmented cross-sectional view of a primary portion of the vibration-damping assembly according to the first embodiment shown in FIG. 3.

As exemplarily illustrated in FIG. 4, respective vibration-damping rubbers 23 of respective vibration-damping assembly 2A are thoroughly made from synthetic rubber or the like and have sandglass-like shapes with narrow central portions, and at both upper and lower ends of each vibration-damping rubber 23 is secured through baking a mounting portion 24 with a bolt 25 projecting therefrom. The bolt 25 of the mounting portion 24 on the lower side of the vibration-damping rubber 23 is inserted into the long hole 21 of the leaf spring 20 from upside, and to the bolt 25 is screwed a nut 27 from downside to support the leaf spring 20 between the mounting portion 24 and the nut 27, which allows the vibration-damping rubber 23 to be connected to the leaf spring 20 in series.

The bolt 25 of the mounting portion 24 on the upper side of the vibration-damping rubber 23 is inserted from underside to the long hole 13 which is formed on a saucer-shaped support plate 12 made of stainless steel to rotatably support the engine 10 in a horizontal plane through the bearing portion 11, and the nut 27 is screwed to the bolt 25 from upside to support the support plate 12 between the mounting portion 24 and the nut 27. The long hole 13 of the support plate 12 is formed on the support plate 12 with a length and at a position so as to be plane-symmetrical about the long holes 21 of the leaf springs 20.

In the vibration-damping assembly 2A with the aforementioned construction according to this embodiment, the leaf spring 20 and the vibration-damping rubber 23 with characteristics different from each other are connected to each other in series, so that the vibration-damping assembly 2A has sufficient vibration-damping effect in wider range of vibration in comparison with a vibration-damping assembly with a leaf spring or a vibration-damping rubber, and the durability of the vibration-damping assembly 2A is improved in comparison with a vibration-damping assembly with a coil spring only.

Figure 5:
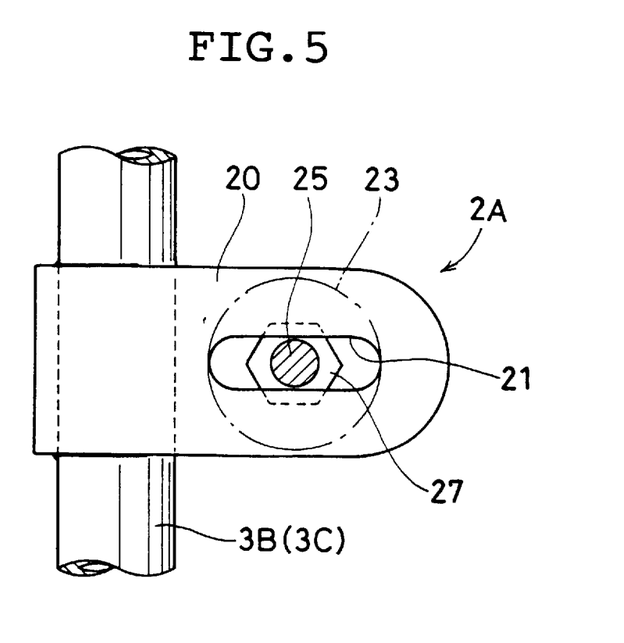
FIG. 5 is a plan view of the vibration-damping assembly taken along the line V—V in FIG. 4.

Further, in the vibration-damping assembly 2A according to this embodiment, the long holes 21, 13 are formed in such a manner as described above on the leaf springs 20 and the support plate 12, so that the position that the vibration-damping rubber 23 is connected and secured to the leaf spring 20 is changeable in a direction that the long holes 21, 13 extend as occasion demands. As a result, since the effective spring constant of the leaf springs 20 vary with the position that the vibration-damping rubber 23 is connected and secured, when the engine 10 mounted is replaced, for example, the spring constant of the vibration-damping assembly 2A can be adjusted to obtain the best vibration-damping effect.

Figure 6:
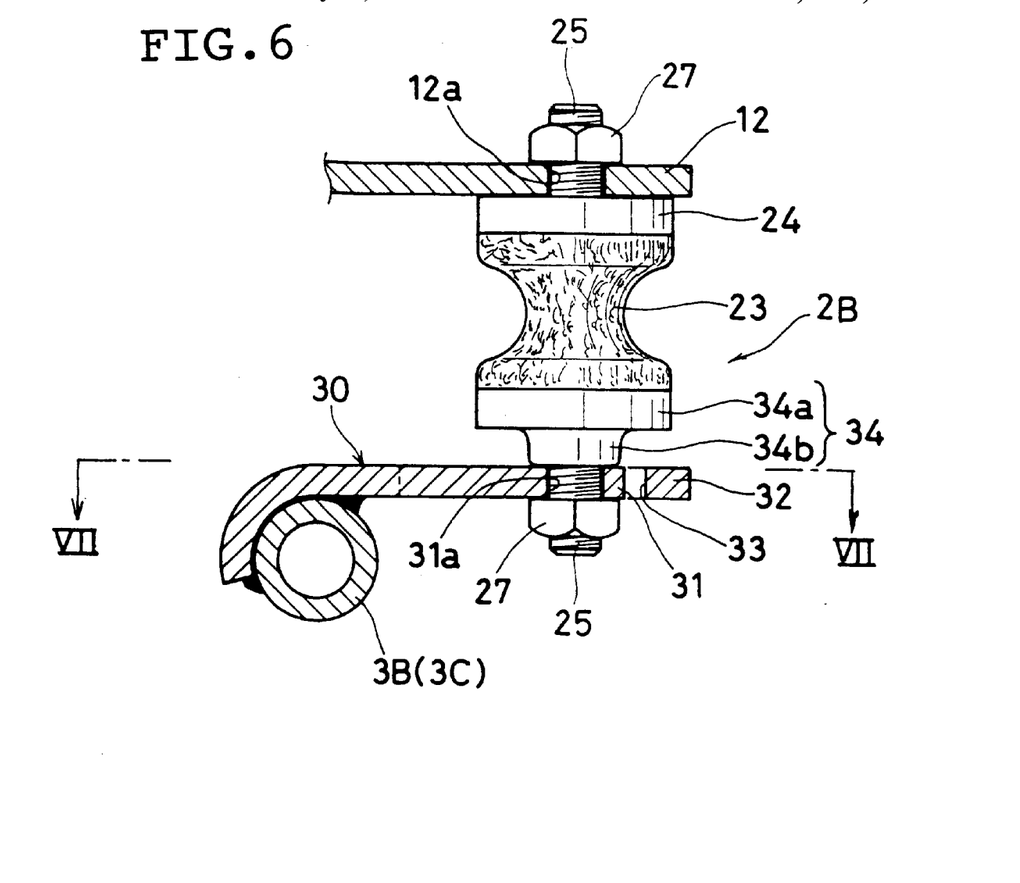
FIG. 6 is a fragmented enlarged view of a primary portion of the vibration-damping assembly according to the second embodiment of the present invention.
Figure 7:
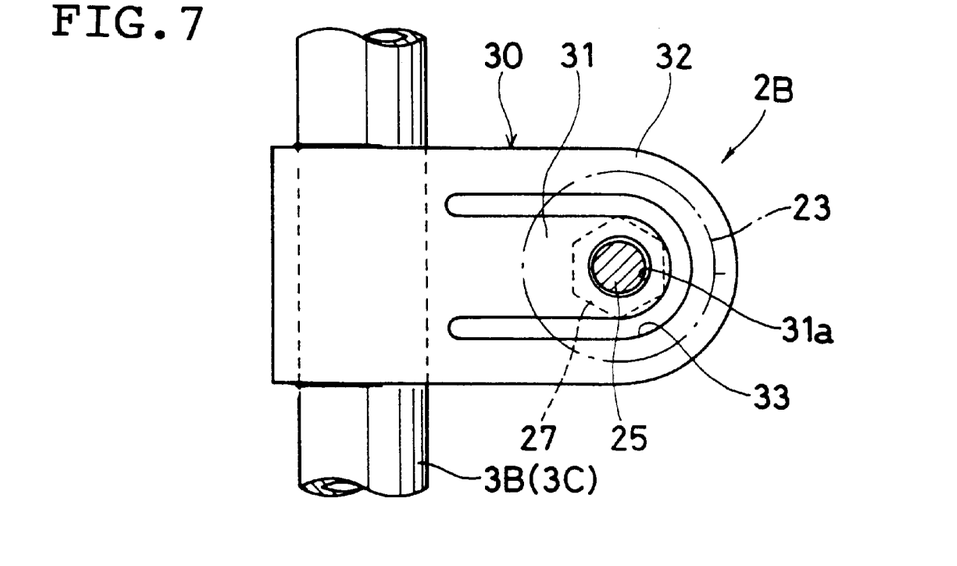
FIG. 7 is a plan view of the vibration-damping assembly taken along the line VII—VII in FIG. 6.

FIGS. 6, 7 show a vibration-damping assembly according to the second embodiment of the present invention, in those figures, parts and elements corresponding to those in the vibration-damping assembly 2A according to the first embodiment and the portable power grass trimmer 1 to which the vibration-damping assembly 2A is applied have the same reference symbols as those illustrated in FIGS. 1 to 5, and repeated explanation thereof will be omitted. The difference of the parts and elements between the first and the second embodiments will mainly be explained below.

In the vibration-damping assembly 2B according to this embodiment, the leaf spring 30 is divided into two parts, a central spring portion 31 and an outer peripheral spring portion 32, with a U-shaped stampedout channel 33 in between so as to allow a portion of the leaf spring 30 on the free end side from the center thereof to independently bend. Further, the mounting portion 34 on the lower side of the vibration-damping rubber 23 is formed so as to have a convex cross section with a downward projection with an upper portion 34a with larger diameter, and a lower portion 34b with smaller diameter which projects downward from the upper portion 34a. A stud bolt 25, which projects downward from the lower small diameter portion 34b of the leaf spring 30, is inserted from upside into a through hole 31a, which is formed at an end of the spring portion 31 of the leaf spring 30. To the bolt 25 is screwed a nut 27 from downside to support the central spring portion 31 of the leaf spring 30 between the smaller projecting lower portion 34b of the mounting portion 34 and the nut 27.

Figure 8A:
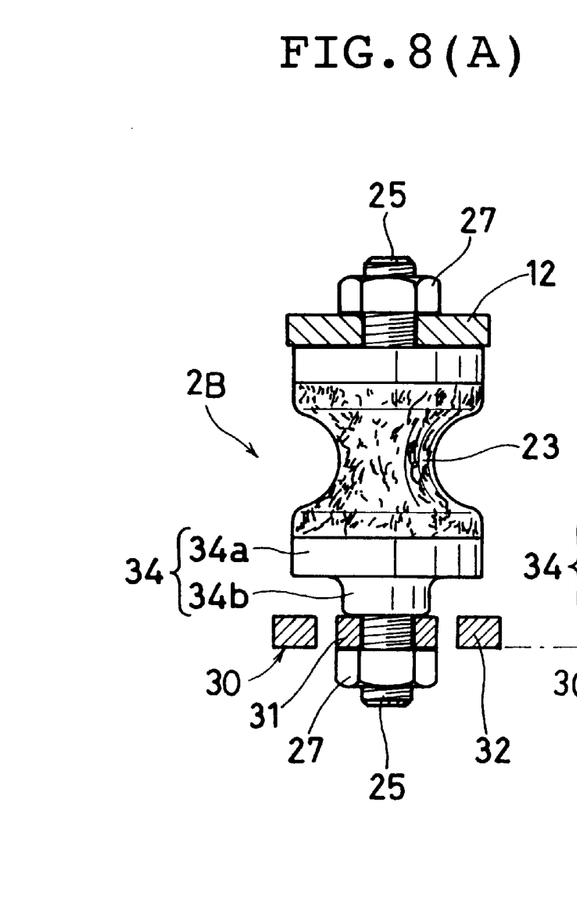
FIGS. 8(A), 8(B) and 8(C) represent a fragmented view of a primary portion for explaining the motion of the vibration-damping assembly according to the second embodiment illustrated in FIG. 6.
Figure 8B:
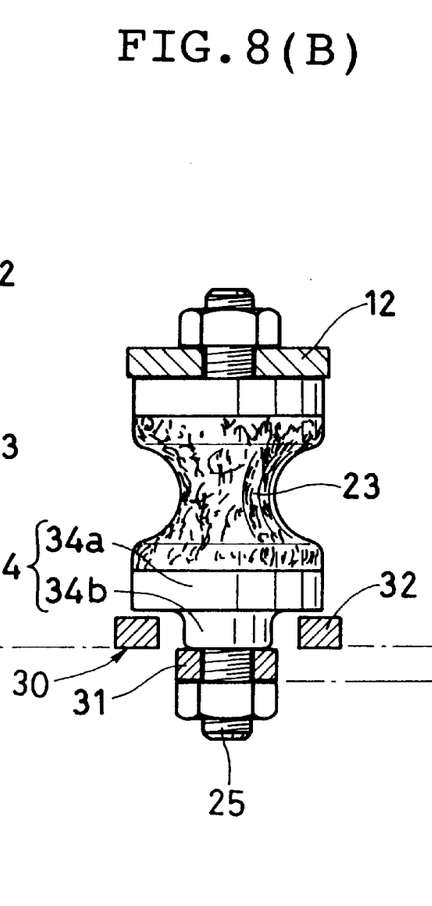
Figure 8C:
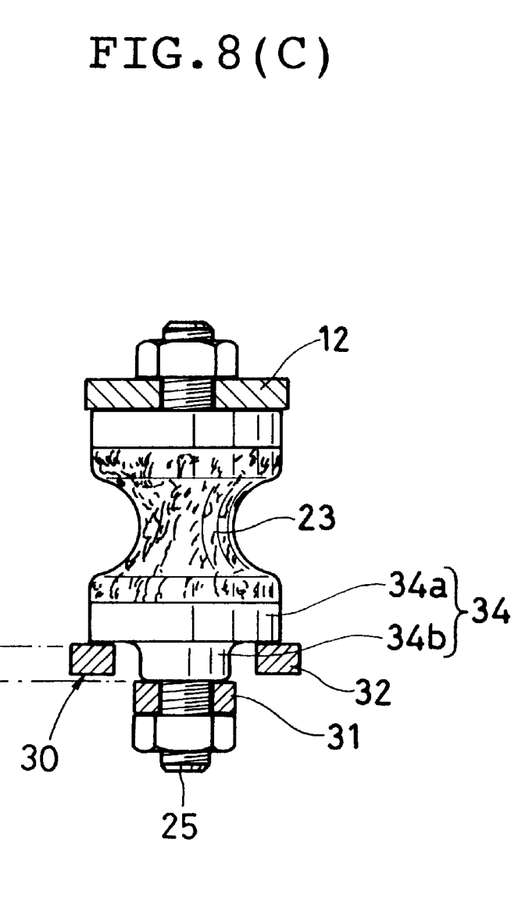

In the vibration-damping assembly 2B with the above-mentioned construction according to this embodiment of the present invention, as illustrated in FIGS. 8(A), 8(B), and 8(C), the outer peripheral spring portion 32 is pressed to the upper portion 34a of the mounting portion 34 after the central spring portion 31 is pressed so as to bent downward more than a predetermined amount. In other words, the leaf spring 30 is divided into a plurality of spring portions 31, 32 and the number of portions functioning as vibration-damping members increases as amplitude of vibration increases.

As a result, the spring constant of the leaf spring 30 changes in two stages, permitting the range of amplitude of vibration that the vibration-damping assembly 2B covers to considerably be increased from minute vibration to rolling or the like.

Figure 9A:
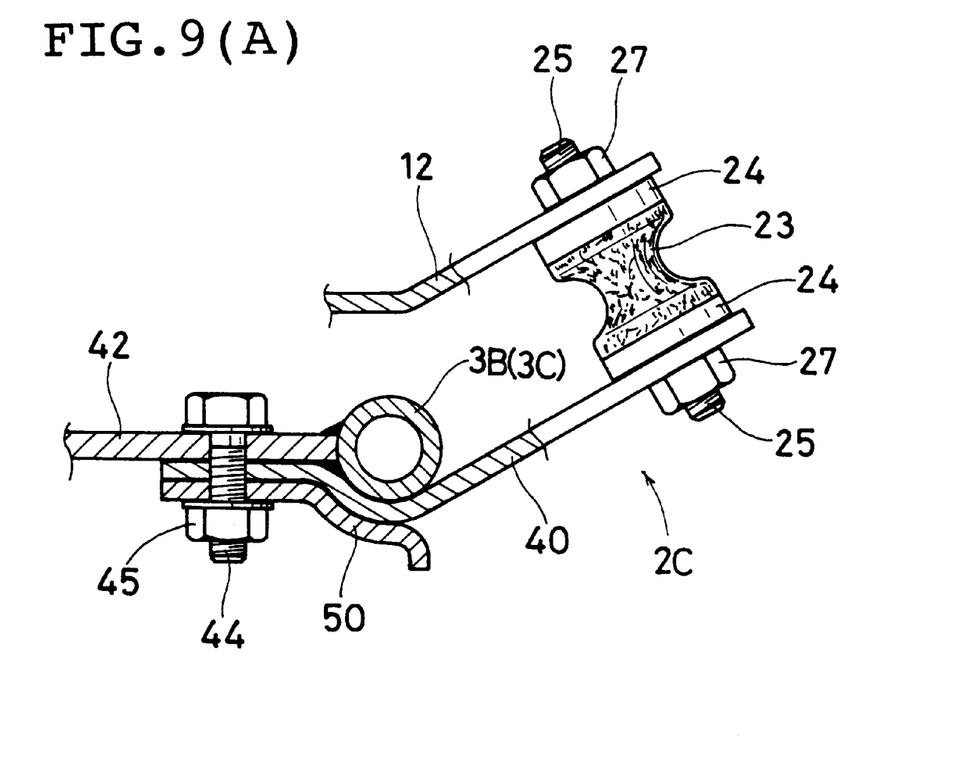
FIGS. 9(A) and 9(B) is a fragmented enlarged view of a primary portion of a vibration-damping assembly according to the third embodiment of the present invention.
Figure 9B:
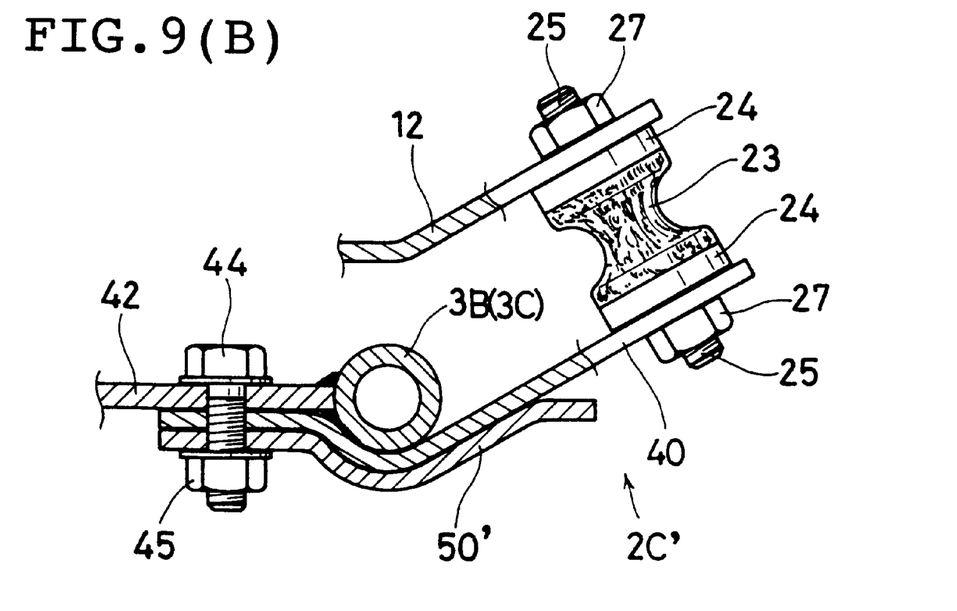

FIG. 9 shows a vibration-damping assembly according to the third embodiment of the present invention, and in this figure, parts and elements corresponding to those in the vibration-damping assembly 2A according to the first embodiment and the portable power grass trimmer 1 to which the vibration-damping assembly 2A is applied have the same reference symbols as those illustrated in FIGS. 1 to 5, and repeated explanation thereof will be omitted. The difference of the parts and elements between the first and the third embodiments will mainly be explained below.

In a vibration-damping assembly 2C according to this embodiment shown in FIG. 9(A), the leaf spring portion consists of a long leaf spring member 40 and a first short leaf spring member 50 shorter than the long leaf spring member 40, and the long leaf spring member 40 and the first short leaf spring member 50 are overlapped with each other, and base end portions thereof are detachably secured to the support plate 42 welded to the stand portions 3B, 3C through a bolt 44 and a nut 45. In this case, the arc central portion of the long leaf spring member 40 is naturally press-contact with the outer peripheral surface of the stand portions 3B, 3C, and the first short leaf spring member 50 has a length so as to be overlapped with the long leaf spring member 40 up to about the arc central portion described above.

The vibration-damping assembly 2C' according to this embodiment illustrated in FIG. 9(B) is provided with a leaf spring portion consisting of the long leaf spring member 40 and a second short leaf spring member 50', which is shorter than the long leaf spring member 40 but longer than the first short leaf spring member 50, and the long leaf spring member 40 and the second short leaf spring member 50' are, like the vibration-damping assembly 2C, closely overlapped with each other, and base end portions thereof are detachably connected and secured to the support plate 42 welded to the stand portions 3B, 3C through a bolt 44 and a nut 45. In this case, the second short leaf spring member 50' has a length such that a free end thereof reaches about the central portion of the long leaf spring member 40.

As described above, a plurality kinds of leaf springs (50, 50') as short leaf spring members with different length from each other are prepared, and a short leaf spring is replaced in accordance with required length as occasion demands. As a result, the effective spring constant of the leaf spring portion is changeable, therefore, when an engine mounted is changed for instance, the spring constant of the vibration-damping assembly 2C can be adjusted to obtain the best vibration-damping effect.

As described above, the embodiments of the present invention are explained in detail, however, the present invention is not limited to these embodiments, and it is possible to change the construction of the vibration-damping assembly according to the present invention in design without departing from the concept of the claimed invention.

For example, in the above embodiments, the vibration-damping assembly according to the present invention is applied to a portable power grass trimmer, however, the vibration-damping assembly according to the present invention is applied not only to the portable power grass trimmer but also other working machine and assembly regardless of the portion where the vibration-damping assembly is mounted.

As understood from the above explanation, in the vibration-damping assembly according to the present invention, the leaf spring and the vibration-damping rubber with characteristics different from each other are connected to each other in series, so that the vibration-damping assembly has sufficient vibration-damping effect in wider range of vibration in comparison with a vibration-damping assembly with a leaf spring or a vibration-damping rubber, and the durability of the vibration-damping assembly is improved in comparison with a vibration-damping assembly with a coil spring only.

Further, in the vibration-damping assembly according to the present invention, a long hole may be formed on the leaf spring in such a manner as described above, so that the position that the vibration-damping rubber is connected and secured to the leaf spring is to be changeable in a direction that the long holes extend as occasion demands, or the leaf spring portion may comprise a long leaf spring member and a short leaf spring member shorter than the long leaf spring member of which base end portions are connected to each other, and for instance, a plurality kinds of leaf springs as short leaf spring members with different length from each other are prepared, and a short leaf spring is replaced in accordance with required length as occasion demands. As a result, the effective spring constant of the leaf spring portion can be changed, therefore, when an engine mounted is changed for instance, the effective spring constant of the vibration-damping assembly is adjustable to obtain the best vibration-damping effect.

Still further, in the vibration-damping assembly according to the present invention, the leaf spring is divided into a plurality of spring portions so as to allow a portion of the leaf spring on the free end side thereof from a center to independently bend, and the number of portions functioning as vibration-damping members increases as amplitude of vibration increases. As a result, the spring constant of the leaf spring changes in a plurality of stages, permitting the range of amplitude of vibration that the vibration-damping assembly covers to considerably be increased from minute vibration to rolling or the like.

What is claimed is:

1. A vibration-damping assembly comprising a leaf spring and a vibration-damping rubber which are attached to each other in series, wherein;

said leaf spring is divided into at least first and second separate spring portions so that at least one of said separate spring portions, at a free end side thereof, is independently bendable, and an increasing number of the separate spring portions function as vibration-damping members as amplitude of vibration increases, such that an effective spring constant of said assembly increases, due to said increasing number of separate spring portions which function as vibration-damping members, as said amplitude increases, and said separate spring portions comprise a central spring portion and an outer peripheral spring portion with a U-shaped channel in between, and further comprising:

a mounting portion projecting from a lower end of said vibration-damping rubber, having a lesser-diameter lower portion which is securely attached to said central spring portion, and having a greater-diameter upper portion which meets the outer peripheral spring portion when the central spring portion has bent a predetermined amount.

2. The vibration damping assembly of claim 1, further comprising means for attachment between a support and a prime mover in a portable power working machine.

* * * * *